US006976060B2

(12) United States Patent
Manczak et al.

(10) Patent No.: US 6,976,060 B2
(45) Date of Patent: Dec. 13, 2005

(54) SYMMETRIC SHARED FILE STORAGE SYSTEM

(75) Inventors: Olaf Manczak, Hayward, CA (US); Kacper Nowicki, Hayward, CA (US); Luis A. Ramos, Glendale, CA (US); George M. Feinberg, Windham, ME (US); Waheed I. Qureshi, Danville, CA (US)

(73) Assignee: Agami Sytems, Inc., San Jose, CA (US)

( * ) Notice: Subject to any disclaimer, the term of this patent is extended or adjusted under 35 U.S.C. 154(b) by 794 days.

(21) Appl. No.: 09/731,418

(22) Filed: Dec. 5, 2000

(65) Prior Publication Data

US 2002/0161855 A1 Oct. 31, 2002

(51) Int. Cl.[7] .............................................. G06F 15/16
(52) U.S. Cl. ....................................... 709/219; 709/245
(58) Field of Search ................................ 709/217, 219, 709/245

(56) References Cited

U.S. PATENT DOCUMENTS

| | | | |
|---|---|---|---|
| 5,727,197 A | | 3/1998 | Burgess et al. |
| 6,023,579 A | | 2/2000 | Hellgren et al. |
| 6,044,217 A | | 3/2000 | Brealey et al. |
| 6,161,104 A | * | 12/2000 | Stakutis et al. ............... 707/10 |
| 6,282,548 B1 | * | 8/2001 | Burner et al. ............ 707/104.1 |
| 6,405,198 B1 | | 6/2002 | Bitar et al. |
| 6,549,934 B1 | * | 4/2003 | Peterson et al. ............ 709/203 |
| 6,553,378 B1 | * | 4/2003 | Eschelbeck ................... 707/10 |
| 6,792,424 B1 | * | 9/2004 | Burns et al. ................. 709/217 |
| 6,857,012 B2 | * | 2/2005 | Sim et al. .................... 709/222 |

OTHER PUBLICATIONS

Ross, Simon; "The Great SAN Debate"; Server/Workstation EXPERT (Swexpert) publishing, retrieved from http://swepert.com, Jul. 2000.*
Nagle, D. et al.; "Network Support for Network Attached Storage", Proceedings of Hot Interconnects, Aug. 1999.*
Yoshida, Hu; "LUN Security Considerations for Storage Area Networks", HITACHI Data Systems, 1999.*
Preslan, K. et al.; "Scalability and Failure Recovery in a Linux Cluster File System", 4th Annual Linux Showcase and Conferecne, Oct. 2000.*
PCT Search Report dated Dec. 11, 2002 corresponding to PCT/US02/18948.

* cited by examiner

Primary Examiner—Marc D. Thompson
(74) Attorney, Agent, or Firm—DLA Piper Rudnick Gray US LLP (57) ABSTRACT

A system and method to allow scalability of file storage in terms of capacity and performance through a symmetric multicomputer architecture with shared storage, in which storage and protocol processing resources can be added to (or removed from) the system without any need of recognizing and/or explicitly migrating the data stored in the system. The invention permits accessing files stored (i.e., written) in any of multiple external protocol processing nodes to be retrieved from any other external protocol processing node.

29 Claims, 9 Drawing Sheets

SYMMETRIC SHARED FILE STORAGE SYSTEM

CROSS-REFERENCE TO RELATED APPLICATIONS

The present application is related to commonly owned, co-pending U.S. application Ser. No. 09/709,187, entitled "Scalable Storage" by David Raccah et al., filed Nov. 10, 2000, U.S. application Ser. No. 09/659,107, entitled "Storage System Having Partitioned Migratable Metadata," filed Sep. 11, 2000 and U.S. application Ser. No. 09/664,677, entitled "File Storage System Having Separation of Components," filed Sep. 19, 2000, the contents of each being incorporated herein by reference.

FIELD OF THE INVENTION

The present invention is generally directed to a multicomputer storage architecture and more particularly, to methods and systems that support high scalability in performance and capacity in shared file storage.

BACKGROUND OF THE INVENTION

Conventionally, files stored in a given file server must be retrieved from the same file server. In a massively scalable system with a very large number of file servers, whenever a given file server runs out of space or runs out of processing resources, a portion of the file data and metadata must be explicitly migrated to another file server and the remote nodes must be explicitly reconfigured to observe this change.

Figure 1:
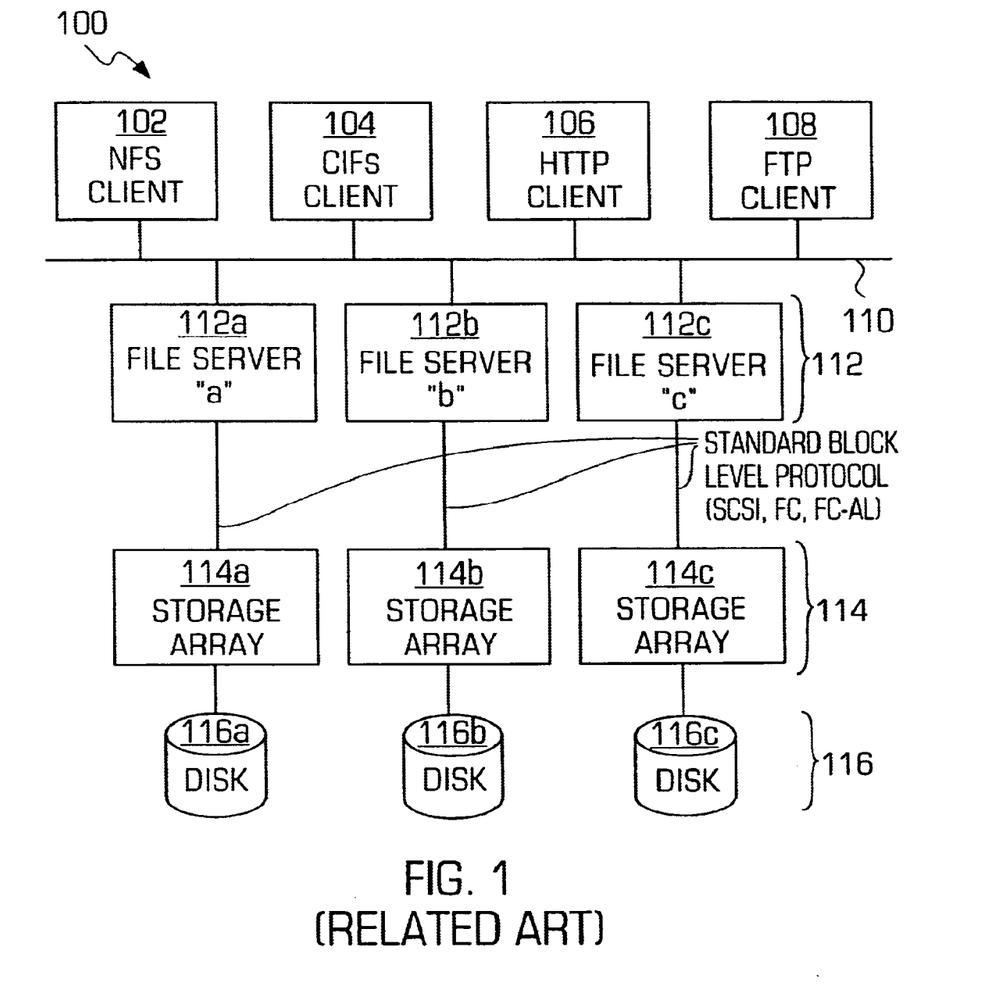
FIG. 1 illustrates a conventional file storage system using network attached storage.

Looking first at FIG. 1, a conventional implementation of Network Attached Storage (NAS) 100 is illustrated. In NAS 100, network protocols such as, without limitation, a Network File System (NFS) client 102, a Common Internet File System (CIFS) client 104, a Hypertext Transfer Protocol (HTTP) client 106, and a File Transfer Protocol (FTP) client 108 are connected through an access network 110 to a plurality of file servers 112a, 112b, and 112c. Each file server 112 is connected to a dedicated storage array 114, and each storage array 114 services a dedicated disk 116. That is, file server 112a is connected to a storage array 14a, which in turn is connected to a disk 116a. In an alternate embodiment, a network administrator may reconfigure the network such that file server 112a is connected to storage array 114b, file server 112b is connected to storage array 114c, and file server 112c is connected to storage array 114a. The characteristic of this architecture is that the reconfiguration of the network requires the intervention of that network administrator.

Figure 2:
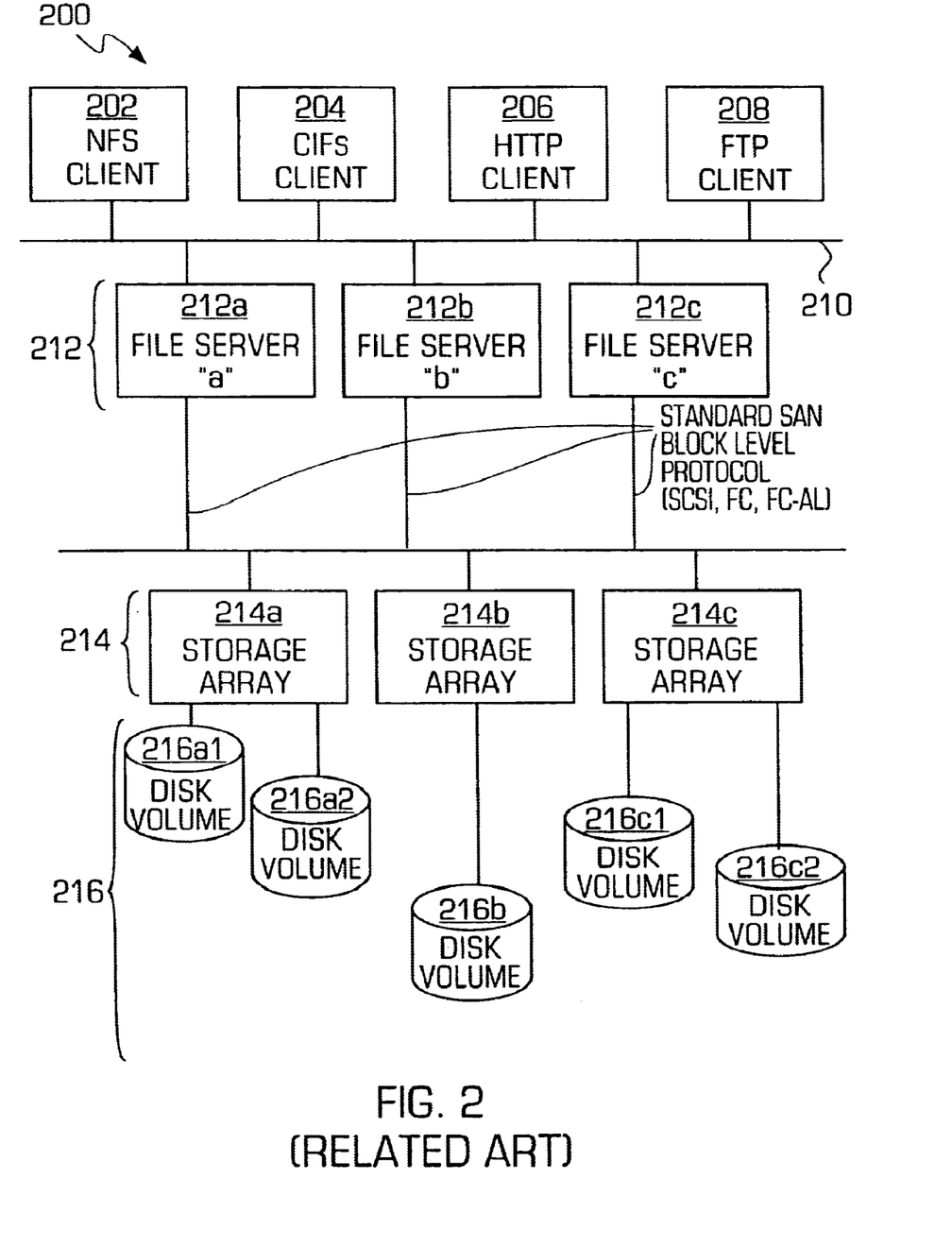
FIG. 2 illustrates a conventional file storage system using storage-area network technology.

Looking now at FIG. 2, a conventional Storage-Area Network (SAN) 200 is illustrated. In SAN 200, network protocols such as, without limitation, a Network File System (NFS) client 202, a Common Internet File System (CIFS) client 204, a Hypertext Transfer Protocol (HTTP) client 206, and a File Transfer Protocol (FTP) client 208 are connected through an access network 210 to a plurality of file servers 212a, 212b, and 212c. Each file server 212 communicates with a storage array using a block level protocol, and each file server 212 is assigned to one or more disk volumes 216. For example and without limitation, file server 212a can be assigned to a disk volume 216a1, file server 212b can be assigned to disk volumes 216a2 and 216c1 file server 212c can be assigned to all of 216b, and disk volume 216c2 can be an unassigned, spare disk volume available for later assignment. Although the file servers of a SAN can be fully connected to all the disk volumes, that is a file server could access any disk volume on the storage-area network, the file server can use a disk volume assigned to this file server and must not directly use disk volumes assigned to other file servers. The characteristic of this architecture is that the disk resources are assigned logically to a file server rather than physically. However, once resources are assigned, another file server cannot use those resources until a formal reassignment occurs. No effort has been made to extend the conventional approach to file servers, dedicated "filers" and hierarchical mass storage systems in a manner that is distinctively different from existing cluster-based file storage solutions exploiting Storage Area Networks (SAN).

In these traditional approaches to a file storage system built of multiple file servers, each file server "owns" a part of a global file system (i.e., a part of the file system $_{namespace}$ and $_{metadata}$ of all the files belonging to this part of the namespace). Thus, a file stored on a given file server can be accessed later only through this particular file server. Although in the case of hierarchical storage systems, the file servers may share a physical file data repository (e.g. tape or optical disk jukebox), a file can be accessed (in a read-write mode) only through a file server that keeps the file's entry in the file system namespace and metadata (file attributes).

SAN-based cluster file systems on the other hand, may enable sharing of block-oriented devices between cluster nodes. However, this functionality depends on specific support built into the storage devices, such as SCSI locks, etc. Thus, a SAN-based cluster file system solution is limited because of its dependency on the additional functionality being built into the storage device.

SUMMARY OF THE INVENTION

The present invention is a symmetric shared storage architecture wherein a file stored by one of the external protocol processing nodes on a storage server and associated storage device can be retrieved through any other node. Thus, it is sufficient just to add a new external protocol processing node to scale performance of the system, or an empty storage node to scale capacity of the system in a way that is transparent to external client applications.

This approach also enables transparent "vertical" scalability of the storage architecture. One can use a limited number of expensive, high-performance file servers that hold a "working set" of data, and also have a large amount of inexpensive storage (such as low-performance, inexpensive file servers, tape robots, jukeboxes with optical disks, etc.) to provide storage capacity for the "aging" data. The migration of data is entirely transparent and automatic (on-demand upon a request to read or write to a file, or asynchronously whenever a file is being migrated to tertiary storage). Also, file data stored initially on any given Bitfile Storage Service (BSS) node can be migrated later to any other node.

A symmetric shared storage architecture according to the invention enables configuration of redundant sets of nodes within the system such as gateway or storage servers rather than disks within a traditional storage array (set of disks). In a traditional storage array (RAID), data stays available when a disk crashes but becomes unavailable when a file server attached to the storage array goes down. In a symmetric shared storage architecture, a crash of any component (in particular any protocol processing node or storage node) does not affect availability of the data.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 3:
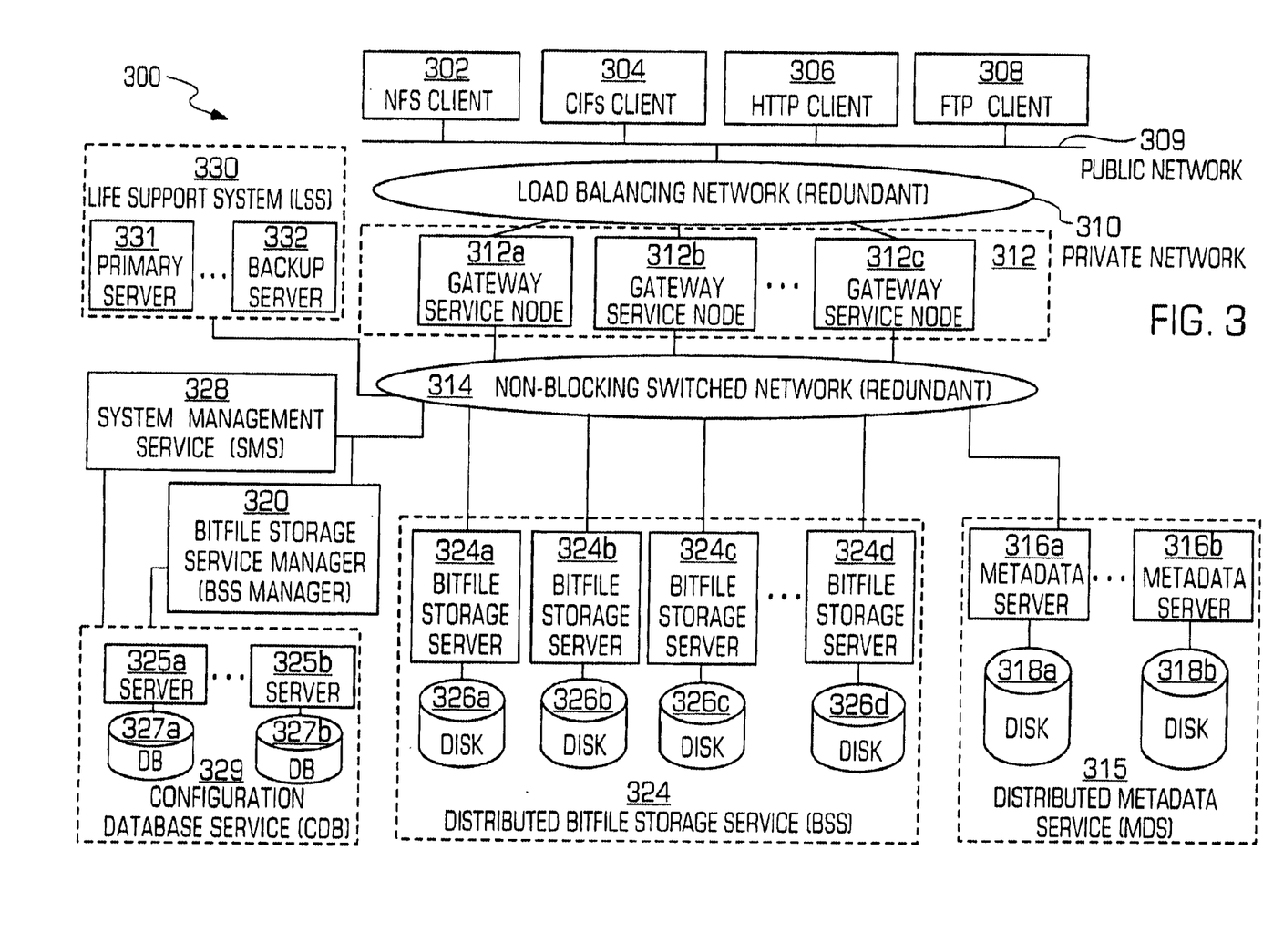
FIG. 3 illustrates an example of a file storage system according to the present invention.

An example of a symmetric shared storage system 300 according to an embodiment of the present invention is illustrated in FIG. 3. As shown in FIG. 3, clients of symmetric shared storage system 300 access the data network of the filer through a variety of application programs such as an NFS client 302, a CIFS client 304, an HTTP client 306 or an FTP client 308. These types of applications are provided for purposes of illustration only, and are not limiting. The client applications connect to the data network through a load balancing node (e.g., by way of a public network 309). A load balancing node can be one or more load balancing nodes that make up a private load balancing network 310 to provide increasing levels of availability, redundancy, and scalability in performance. For example, two load balancing nodes can provide greater availability, redundancy, and scalability of performance than one load balancing node. Three load balancing nodes can provide more than two, etc. A single load balancing node is shown in FIG. 3 for purposes of illustration only and is not limiting.

Load balancing node/network 310 then connects to one or more gateway service nodes 312 (e.g., nodes 312a–c). Gateway service nodes 312 are connected to an internal network 314. In one implementation, internal network 314 is a switched Internet Protocol (IP) based network, but the invention is not limited to that. Internal network 314 consists of one or more network services that provides connectivity to a distributed Bitfile Storage Service (BSS) 324 made up of one or more Bitfile Storage Servers 324a–d, and storage devices 326a–d. Internal network 314 is also connected to a distributed Metadata Service (MDS) 315 made up of one or more metadata servers 316a–b and storage devices 318a–b, a Bitfile Storage Service Manager (BSS Manager) 320, a System Management Service (SMS) 328, and Life Support Service (LSS) 330 made up of a primary 331 and backup server 332, and a Configuration Database Service (CDB) 329 made up of one or more CDB servers 325a–b, and databases 327a–b. Although filer 300 is illustrated as comprising a distributed BSS 324 made up of four Bitfile Storage Servers 324a–d, a distributed MDS 315 made up of two metadata servers 316a and 316b, an LSS 330 made up of a primary server 331 and backup server 332, a CDB Service 329 made up of two CDB servers 325a–b, one instance of BSS Manager server 320 and one instance of SMS 328, those skilled in the relevant art(s) will understand, based on the teachings contained herein, that additional bitfile storage servers 324, metadata servers 316, BSS Manager servers 320, SMS instances 328, and LSS instances may be added to the network and still be within the spirit and scope of the invention. Most services provide redundancy, that is, they have a pair of servers. However, some services such as the BSS Manager and SMS are stateless and will be automatically restarted. With this pair scheme and stateless feature, the system is completely redundant and does not have a single point of failure.

Gateway Service (GS) nodes 312a through 312c provide external access to the entire system and are the only service that can be accessed by a user. The GS 312 is connected to both the internal private network 314 and to an outbound load balancing network 310. However, those skilled in the relevant arts would recognize that although the GS 312 communicates with internal clients and external clients, internal private network 314 and outbound load balancing network 310 are but examples, and the physical and virtual network layouts are not limited to these or any particular layout. In this way, each of the GS nodes 312 provides access to all the files stored in the system for applications that are executed on the GS nodes, as well as remote outbound nodes that communicate through the network using standard file access protocols such as NFS, CIFS, HTTP, IMAP, POP, etc. Files stored in the system can be accessed in an identical way from an application executed on any of the GS nodes and GS nodes can enable network access to the file repository. Thus, the system 300 is "symmetrical" in that each gateway node has uniform access to metadata stored in MDS 315 and file data stored in BSS 324 so that client requests for file access can be serviced by any gateway node without any performance penalty. Further, the particular gateway node that is directed by load balancer 310 to service the client request for file access is transparent to the client.

A GS node does not hold either file data or metadata persistently, but rather mediates communication between an application or a remote network node and the services that hold persistent file data (BSS) and metadata (MDS). Thus, the GS need not keep any persistent (nonvolatile) state, but it can keep volatile state; for example, it can cache both file data and metadata to provide better performance.

A GS node 312a–c communicates directly with a BSS node 324a–d to perform an I/O operation on file data. However, in order to determine what BSS node 324a–d to communicate with, it uses the file data location provided by the MDS 315. The MDS 315 gets all the file system namespace and attribute operations (for example, look-up files by name, read directory entries, get and set file attributes) from its communication with the GS nodes who implement the file access applications such as NFS, CIFS, HTTP, IMAP, POP, etc. The Metadata Service (MDS) 315 holds the file system namespace and the file metadata (attributes). Holding the file system namespace and file attributes in the MDS eliminates any need for the GS nodes to keep persistent state about file system namespace and file metadata (attributes). However, the GS nodes may cache this information for better performance.

The Bitfile Storage Service (BSS) 324 provides persistent storage for the file data stored in the system. Each of the nodes 324a–d offers shared network access to storage devices 326a–d it can control directly.

The BSS Manager 320 manages crash recovery in the BSS 324, as well as file data migration and replication between different nodes in a manner that will be described in more detail in connection with FIGS. 7 and 8. The BSS Manager 320 makes this process transparent to the Gateway Service 312 and to clients who access the system through it.

The Life Support Service (LSS) 330 monitors resource shortages and failures and routes around planned and unplanned resource outages to minimize human interaction to manage the system. This is a logical service that does not require dedicated physical resources, but rather uses physical resources of the GS, MDS, and BSS.

The System Management Service (SMS) 328 configures, monitors, and controls physical and logical resources associated with the symmetric shared storage system. Most of this service is a logical service that does not require dedicated physical resources, but rather uses the physical resources of the GS, MDS, and BSS. However, the SMS 328 accesses the CDB 329 for stored information. CDB 329 must be hosted separately and may require its own physical resources.

In general, each GS node 312a–c need not be aware of the other GS nodes and need not keep any state about other nodes, and each BSS node 324 need not be aware of the other BSS nodes and need not keep any state about other nodes. However, each of the GS nodes can communicate with any other node (for example, to guarantee cache consistency) and all BSS nodes can communicate between each other (for example to migrate file data between nodes). One advantage of not keeping any state about other nodes is that nodes can be transparently added to or removed from the GS 312 and the BSS 324. As will be explained in more detail in connection with FIG. 4, adding GS nodes improves performance of the system by increasing the Gateway Service processing resources, while adding BSS nodes increases capacity of the system without the requirement of any explicit migration of file data or metadata. Unlike the case of a traditional file server, the system performance and capacity are not limited by performance or capacity of any single server even if all the users attempt to access or store data in the same part of the file system.

For example, in network 100 (FIG. 1), the combination of storage arrays 114 and disks 116 and in network 200 (FIG. 2), the combination of storage arrays 214 and disks 216 contain both stored data as well as the metadata associated with that data. In the present invention, however, bitfile storage servers 324a–d and their respective disk storage 326a–d contain stored bitfiles, while the metadata associated with the stored bitfiles from all of the bitfile storage servers 324a–d is stored in metadata servers 316a–b and their associated disk storage 318a–b. The terms $_{bitfile}$ and $_{file\ data}$ are equivalent and can be, for example and without limitation, file content (data) of a file, file extents (variable size portion of a file), set of blocks of data (in a block oriented storage), etc. The terms $_{bitfile}$ and $_{file\ data}$ should not be construed as to limit the invention to any particular semantic.

An example of filing and retrieving data in the present invention as compared to the prior art will now be provided. Referring back to FIG. 1, an application accesses NAS 100 by using an application program running on a client such as NFS client 102 and using a network protocol such as NFS. The command to store data from the application is routed via access network 110 to a selected file server 112 (e.g., file server 112a). The data is then stored by the respective storage array (e.g., storage array 114a) onto the corresponding disk 116 (e.g., disk 116a). The metadata associated with that data is created as part of this storage process and is also stored on the same disk (e.g., disk 116a). When a client desires to access the data to either read it or to modify it, the client must then access the data through the same file server (e.g., file server 112a) to the same storage array and disk (e.g., storage array 114a and disk 116a). If the client were to access file server 112b, the client would not be able to gain access to the data.

Referring back FIG. 2, an example of storing and retrieving data is herein provided. An application accesses SAN 200 by using an application running on for example NFS client 202 and using a network protocol such as NFS. The command to store data from the application is routed via access network 210 to a selected file server 212 (e.g., file server 212b). The data is then stored by the assigned storage array (e.g., storage array 214a) onto the corresponding assigned disk volume 216 (e.g., disk volume 216a1). The assigned disk volume can be any of the network. The metadata associated with that data is created as part of this storage process and is also stored on the same disk volume (e.g., disk volume 216a1). When a client desires to access the data to either read it or to modify it, the client must then access the data through the same file server (e.g., file server 212b) that is assigned to the same storage array, and disk volume (e.g. storage array 214a and disk volume 216a1). If the client were to access file server 212a, the client would not be able to gain access to the data. However, the network administrator would be able to reassign storage array 214a and disk volume 216a1 to server 212a.

In the present invention (FIG. 3), the application accesses data storage network 300 by using an application running on, for example and without limitation NFS client 302 and using a network protocol, such as, for example and without limitation, NFS. The command to store data is then routed through load balancing node 310. Load balancing node 310 then routes the command to store the data to one of the gateway service nodes 312 (e.g. gateway service node 312a). The data is then routed through internal network 314 to a selected bitfile storage server 324 and corresponding disk 326 (e.g., bitfile storage server 324a and disk 326a) using a proprietary file/block oriented protocol according to a policy directed by bitfile storage service manager 320. This policy may be, for example and without limitation, to store the data on the disk that has the most available storage capacity. When the data is stored on a disk 326, the metadata created corresponding to that stored data (e.g. by gateway service node 312a in communication with BSM 320) is then stored by MDS 315, for example and without limitation, by one of the Metadata servers 316 (e.g. Metadata server 316a)

on one of the disks 318 (e.g. on disk 318a). Thus, the file data (on Bitfile Storage Servers 324 and disks 326) and the metadata (on Metadata Servers 316 and disks 318) associated with the file data are stored in two separate locations. All metadata associated with data stored in data storage network 300 is stored by for example and without limitation MDS 315 on Metadata Servers 316 and disks 318.

When the original client, or another client, attempts to access this stored data at a subsequent time, the command to access the data is routed from the client's application (e.g., NFS 302 or CIFS 304) through load balancing node 310 to a gateway service node 312. This gateway service node does not have to be the same node as was used to store the data originally. The command to access the data is then routed from Gateway Service node 312 (e.g., Gateway Service node 312b) through internal network 314 to Metadata Server 316 (e.g., server 316a). Metadata Server 316 obtains the metadata for the requested data from disk 318 (e.g., server 318a) and directs the request for the data to the appropriate Bitfile Storage Server 324 and corresponding disk 326 (e.g., Bitfile Storage Server 324a and disk 326a). If the data is modified as a result of the access (e.g., more data is added), the metadata is correspondingly updated.

Thus, according to the present invention, the client does not need to know where the data is stored when a request is made to access that data, and the request to access it can be routed through any of the gateway service nodes 312a–c.

Example data structures used to enable this transparency and symmetry, and to maintain correspondence between file identifiers known by clients, and file locations that are transparent to clients are shown in FIGS. 6A to 6D. These data structures are maintained in MDS 315 by servers 316 in disks 318, and are thus used as a portion of the metadata in one example of the present invention. Those skilled in the relevant arts will understand, based on the teachings contained herein, that other data structures may be used and fall within the spirit and scope of the invention. For example, other data structures may be used to maintain file attributes and other information not including file locations in system 300.

Figure 6A:
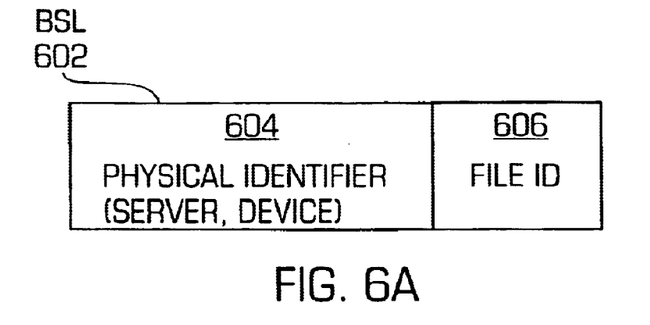
FIGS. 6A to 6D show data structures used in various examples of the present invention.

As shown in FIG. 6A, bitfile storage locator (BSL) 602 is a metadata entry that corresponds a single file having a file identifier (e.g. a filename and/or directory path) specified in field 604 with a physical identifier (e.g. one of the storage servers 324a–d and storage device 326a–d) specified in field 606 that provides a location for the bitfile data of the file in storage service 324. The correspondence between a file and its location in the BSS 324 can be created in accordance with communications with BSM 320 and certain policies implemented by BSM 320 (e.g. store the file in the device having the most space), for example. Thus, a client requesting access to a file need only supply the identifier of the file to the gateway service. The receiving gateway service node 312a–c then communicates with MDS 315 to retrieve the location in BSS 324 of the file corresponding to the given filename.

Figure 6B:
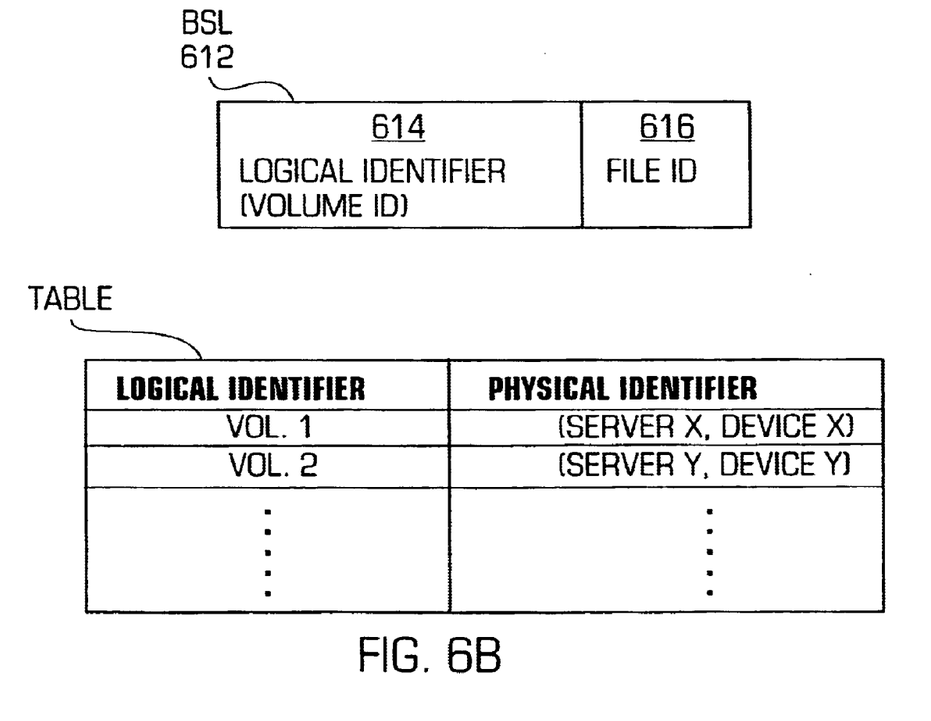

FIG. 6B illustrates another example of data structures that can be used to implement a portion of the metadata maintained by MDS 315. In this example, the physical file locations can be represented as logical (symbolic) locations and mappings (translation tables) from the logical to physical locations (e.g., as established by BSM 320). Accordingly, BSL 612 includes a field 614 that corresponds a logical storage identifier (e.g., a volume identifier) with a file identifier known to a client specified in field 616. The data structures further include a table 623 that corresponds logical storage identifiers with physical storage identifiers reflecting the physical locations of the corresponding logical storage in the BSS 324. Thus, a client requesting access to a file still need only supply the identifier of the file to the gateway service. The receiving gateway service node 312a–c then communicates with MDS 315 to retrieve the location in BSS 324 of the file corresponding to the given filename, in the process the MDS 315 looking up the physical location from a logical identifier associated with the given filename.

Figure 6C:
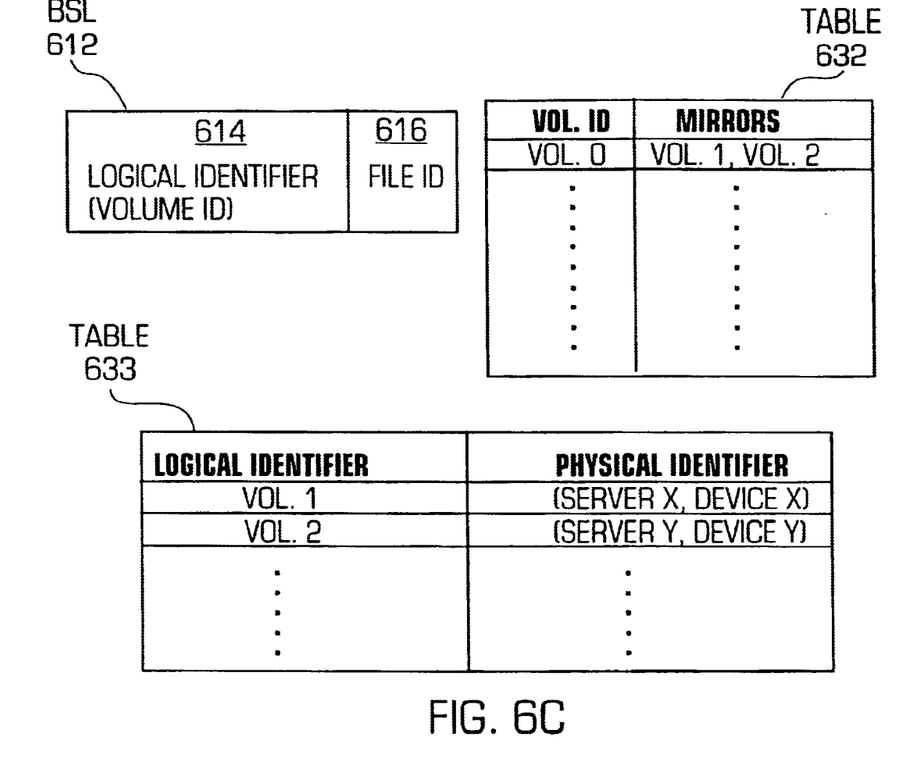

FIG. 6C illustrates another example of data structures used to implement a portion of the metadata maintained by MDS 315 wherein mirroring is used to provide redundancy (e.g., as established by BSM 320). The data structures may include a BSL 612, and tables 632, 633. As shown in FIG. 6C, table 632 includes entries that correspond a first logical identifier (e.g., "vol. 0") with second logical identifiers (e.g., "vol. 1" and "vol. 2") to identify where two copies of the same file are stored. In this example, if one of the servers or one of the storage devices becomes inaccessible, the data will continue to remain available using the mirrored data. The technique of mirroring data is used to increase data availability. The data structures further include a table 633 that corresponds logical storage identifiers with physical storage identifiers reflecting the physical locations of the corresponding logical storage in the BSS 324. Thus, a client requesting access to a file still need only supply the identifier of the file to the gateway service. The receiving gateway service node 312a–c then communicates with MDS 315 to retrieve the location in BSS 324 of the file corresponding to the given filename. In the process of providing the location information, the MDS 315 looks up the logical identifier corresponding to the given filename in table 632 to determine if any mirrors have been specified for the corresponding logical identifier. In either event, MDS 315 looks up in table 633 and provides the physical locations from the logical identifier(s) associated with the given filename back to the gateway service.

Figure 6D:
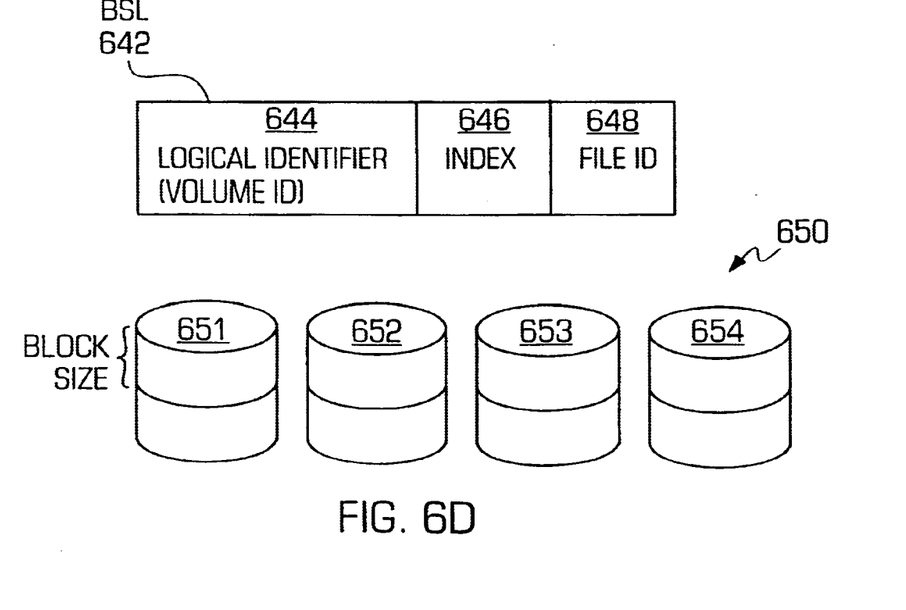

FIG. 6D illustrates another example of data structures used to implement a portion of the metadata maintained by MDS 315 wherein a single file might be stored across one or more storage devices in a group of physical storage devices (e.g., a redundant array of independent disks (RAID), a cluster of disk drives, etc. as established by BSM 320). In this example, BSL 642, a logical identifier field 644, a file identifier field 648, and an index field 646 used to identify in which storage device the start of data is stored. In an embodiment using "striping," an array of disk drives 650 might be used. In the example shown in FIG. 6D four storage devices 651–654 are shown. A file is stored across array of drives 650. The storage device (651–654) where the start of the file is located is identified by the value in the index field 646. Data in a file is then stored in blocks in a sequential fashion across the array of storage devices beginning at the start the storage device identified by the index field 646 value. The size of the blocks is usually limited to not exceed a certain predefined block size. For example, if a file size is 40 KB and the index field 646 points to storage device 651, the first 16 KB of the data in a file will be stored in storage device 651, the second 16 KB of the data in the file will be stored in storage device 652, and the remaining data (8 KB) will be stored in storage device 653. Smaller files (less than the block size) may be stored in any one of the storage devices 651–654. Larger files can wrap around in sequence across the array of storage devices 650. The striping technique can be used to provide parallel access to multiple storage servers and storage devices in order to improve performance.

The following descriptions provide examples of how the transparency and symmetry features of the present invention, as enabled by the storage system architecture illustrated in FIG. 3 and the data structures shown in FIGS. 6A–D, can be exploited by various file storage schemes for certain advantages.

Figure 4:
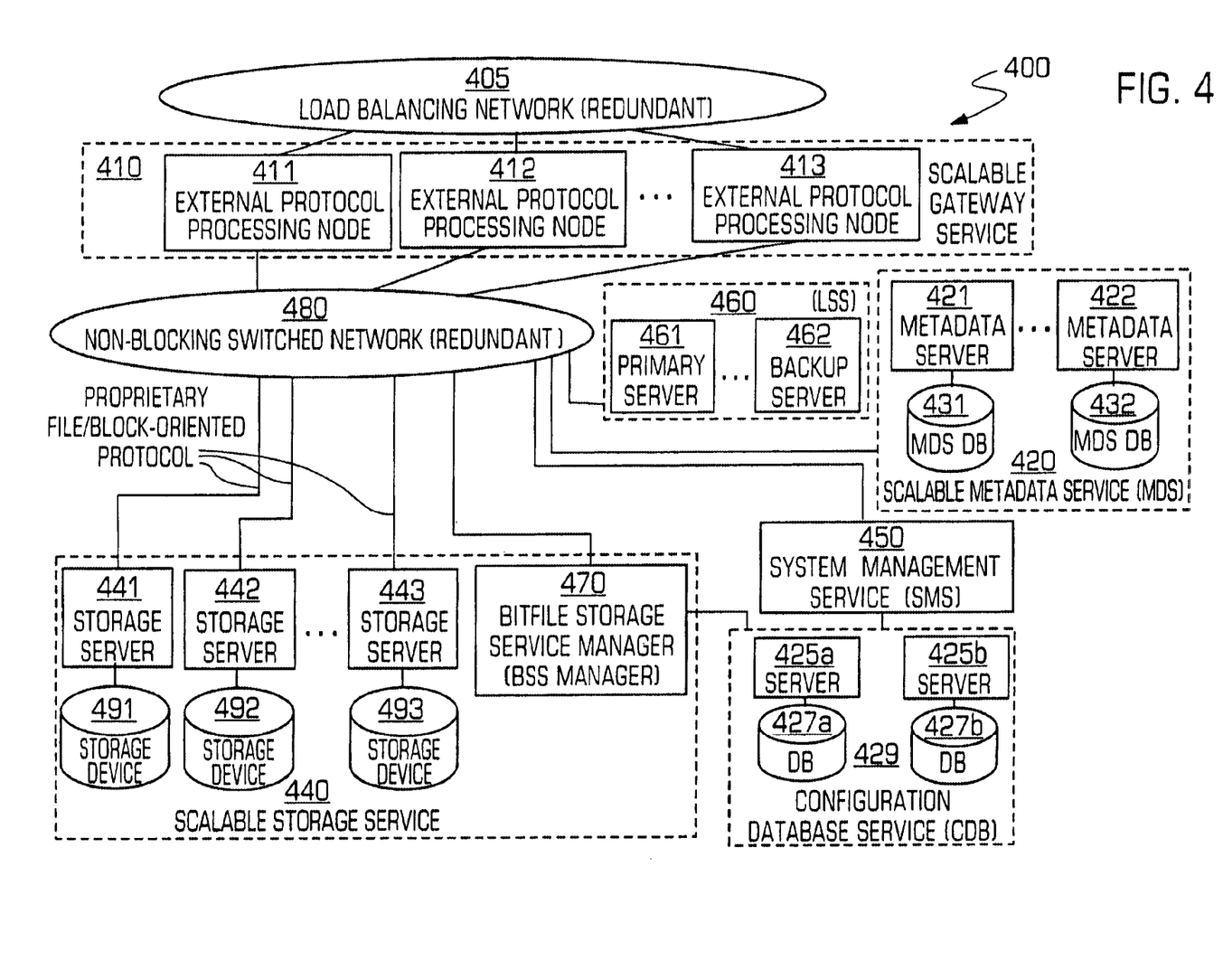
FIG. 4 is a block diagram of a scalable file storage system according to an embodiment of the present invention.

FIG. 4 is a block diagram of a scalable and redundant file storage system 400 according to an embodiment of the present invention. Scalable means that any system resource can be increased by adding more nodes. Redundant means that any system resource can remain available even if any of its components fail. Scalable and redundant file storage system 400 includes a scalable and redundant Gateway Service 410, and a scalable and redundant Metadata Service 420 coupled to Gateway Service 410 through a network 480. A scalable and redundant storage service 440 is coupled to Gateway Service 410 through network 480. A System Management Service (SMS) 450, a Life Support Service (LSS) 460 and a Storage Service Manager 470 are also coupled to network 480. SMS 450, LSS 460, and Storage Service Manager 470 are scalable logical services that do not have dedicated servers, but instead run on other servers in the system, for example and without limitation Metadata Server 421. SMS 450 and Storage Service Manager 470 mediates access to configuration database (CDB) 429, through network 480. CDB 429 is a service hosted separate from the SMS 450 and Storage Service Manager 470 which may require its own physical resources. It should be apparent to those skilled in the art that, although GS 410, MDS 420 and Storage Service 440 are all shown as being scalable, only certain one(s) of them may be scalable.

CDB 429 provides information about the current state of resources in each of GS 410, MDS 420 and BS 440. The SMS uses this information to start and enable various servers. Once the servers are ready for operation, they register with LSS 460. The LSS 460 is responsible for delivering service routing and connectivity information to the various nodes to enable them to communicate with one another as resources are added and removed. The registration with LSS 460 and the subsequent delivery of service routing and connectivity information enables scalability and redundancy of the present embodiment. Scalable and redundant Gateway Service 410 includes a plurality of external protocol processing nodes 411–413 that maybe coupled to a redundant load balancing network 405. Scalable and redundant storage service 440 includes a plurality of storage servers 441–443 and storage devices 491–493. Metadata Service 420 in one embodiment is scalable and redundant, and includes metadata servers 421 and 422, and MDS databases 431 and 432. SMS 450 in one embodiment is scalable. LSS 460 in one embodiment is scalable and includes primary server 461 and backup server 462. CDB Service 429 is scalable and redundant in one embodiment and includes CDB servers 425a–b and CDB databases 427a–b. BSS Manager 470 in one embodiment is scalable.

Figure 5:
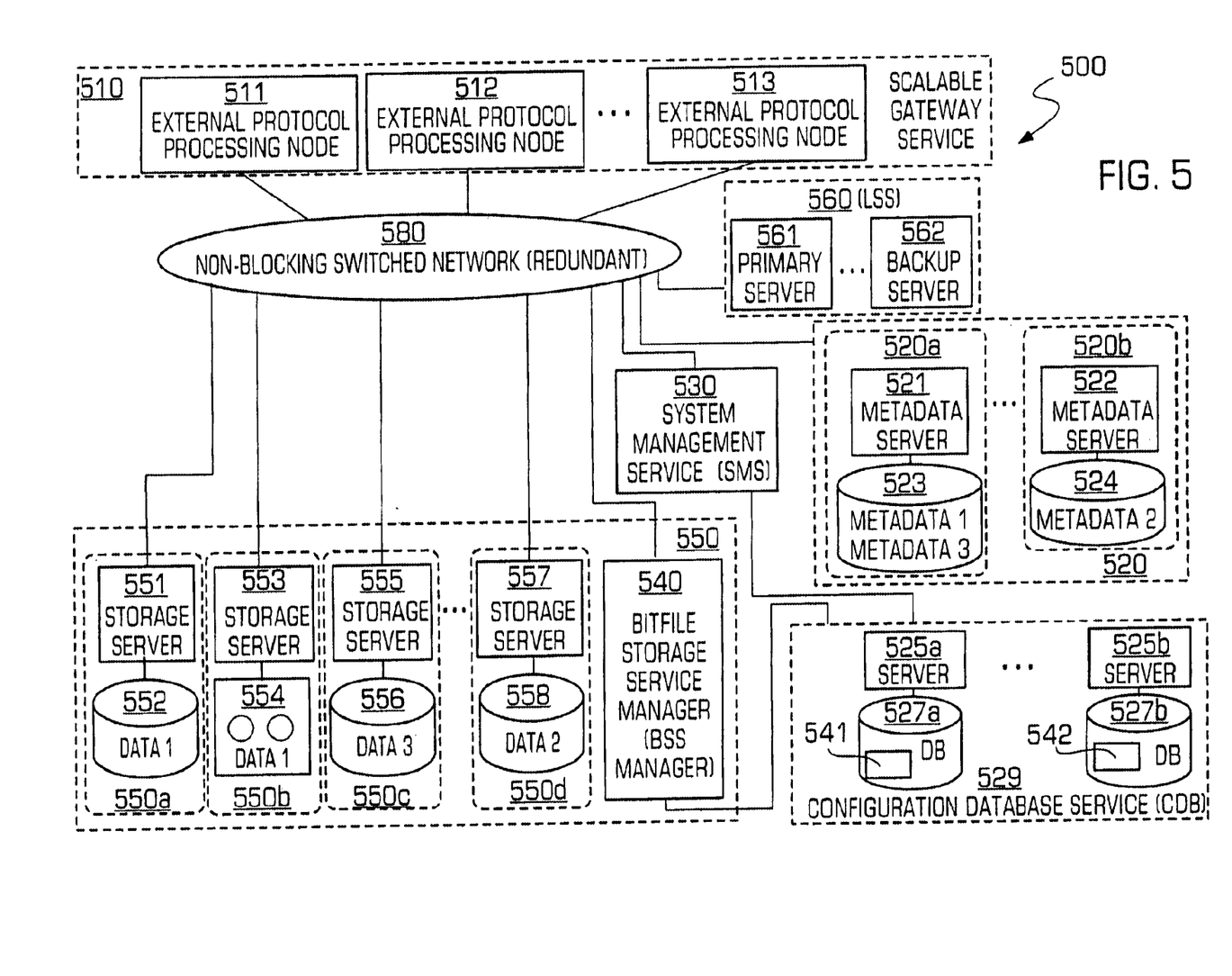
FIG. 5 is a diagram showing metadata and data storage including hierarchical storage management according to one example of the present invention.

FIG. 5 is a diagram showing a metadata and data storage system 500 implementing a hierarchical storage management (HSM) scheme in a scalable and redundant file storage system according to one example of the present invention. In this example, MDS 520 includes one or more metadata nodes. Metadata node 520a includes a Metadata server 521 coupled to a storage device 523. Similarly, Metadata node 520b includes a metadata server 522 coupled to a storage device 524. Storage devices 523 and 524 can be any type of storage device including, but not limited to, devices used in an HSM scheme such as, but not limited to, disk drives. Metadata Servers 521, 522 can be any type of control logic for managing and controlling access to respective storage devices 523, 524. Such control logic can be provided as software, firmware, hardware, or any combination thereof in any type of processor unit. Storage devices 523, 524 can be any type of data storage device storing on any type of media, including but not limited to, disk drives (magnetic or optical), memory, etc. Configuration Database Service 529 includes a CDB server 525a coupled to a configuration database 527a and CDB server 525b coupled to a configuration database 527b. Configuration database 527a includes logical/physical mappings 541 and configuration database 527b includes logical/physical mappings 542. Logical/physical mappings 541 and 542 may be substantially similar to the mappings described with respect to the data structures shown in FIGS. 6A–D.

BSS 550 includes one or more storage nodes. Storage node 550a includes a storage server 551 coupled to a storage device 552. Storage node 550b includes a storage server 553 coupled to a storage device 554. Storage node 550c includes a storage server 555 coupled to a storage device 556. Similarly, storage node 550d includes a storage server 557 coupled to a storage device 558. Storage devices 552, 554, 556, and 558 can be any type of storage device including, but not limited to, devices used in an HSM scheme such as, but not limited to, disk drives and tape drive units. A variety of storage devices can be used to create a logical hierarchy of storage devices that allows frequently accessed data to be stored on disk and infrequently accessed data to be stored on tape. Data can also be migrated between storage nodes as needed.

Storage devices 523 and 524 store metadata. A metadata entry holds for example and without limitation, a file system namespace, file metadata attributes, and identifies the logical or physical (one or more) locations of file data in scalable storage system 300. Storage devices 552, 554, 556, and 558 store data, such as files of any type of format and content (e.g., digital data representing text, audio, video, or any other type of multimedia content or other information). For example, as shown in FIG. 5 and explained in more detail in connection with FIGS. 6A–D, in scalable file storage system 500, a metadata entry ("metadata 1") can be stored in storage device 523. "Metadata 1" identifies the location of a file stored as "data 1" in storage device 552. "Metadata 2" is stored in storage device 524. "Metadata 2" identifies the location of a file stored as "data 2" in storage device 558. "Metadata 3" is stored in storage device 523. "Metadata 3" identifies the location of a file stored as "data 3" in storage device 556. "Metadata 1" can also identify a copy of "data 1" that has been migrated to tertiary storage (i.e., to storage device 554 or to any other storage node or device). Data migration will be described further with respect to FIGS. 7 and 8.

Separation of the file metadata from the file data enables transparent migration of file data between nodes in the BSS layer. However, to achieve transparent data migration from one location in the BSS to another also requires consistent updating of file data locations in the MDS and the invalidation of old locations cached in the external protocol processing nodes. The ability to migrate data transparently further enables usage of the symmetric shared file storage system according to the invention as a hierarchical storage management (HSM) system and provides all the benefits and functionality of traditional HSM systems. For example and without limitation, the BSS servers can control storage devices with different cost and performance characteristics. The BSS provides persistent storage for the file data stored in a file storage system, while the BSM manages file data migration between the different nodes.

Figure 7:
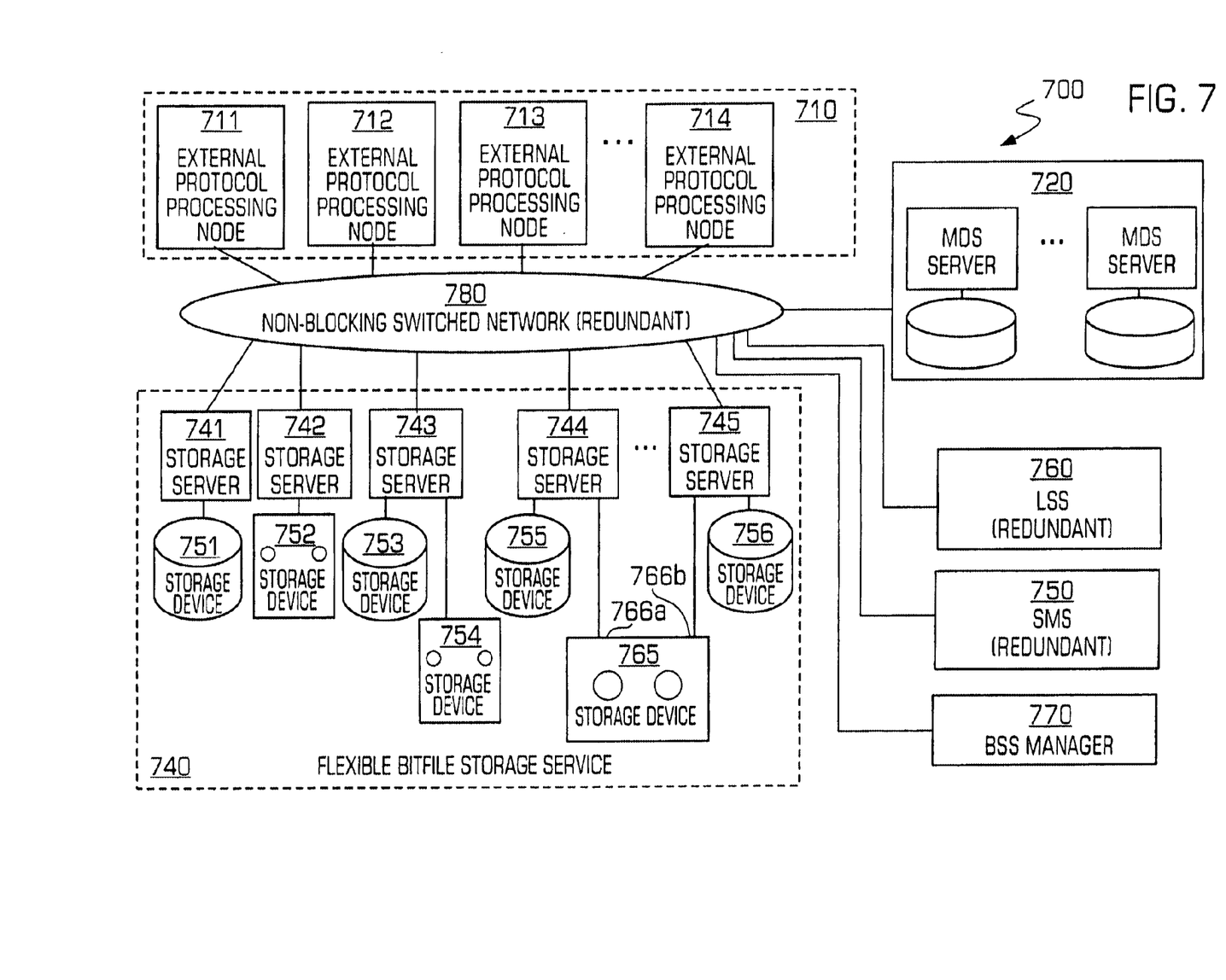
FIG. 7 is a block diagram of storage devices with varying cost and performance characteristics according to an embodiment of the present invention.

FIG. 7 is a diagram of a file system 700 including a flexible BSS 740 controlling storage devices with varying cost and performance characteristics in a file storage system, according to one example of the present invention. BSS 740 is coupled to system 700 through switched network 780. File system 700 also includes BSS Manager 770, SMS 750, LSS 760, MDS 720, and Gateway Service 710, including nodes 711–714, all of which are interconnected by way of switched network 780. Those skilled in the relevant arts will understand, based on the teachings contained herein, that other storage devices and combinations may be used and fall within the spirit and scope of the invention.

Each storage server offers shared network access to some storage it can control directly. In this example, BSS 740 includes disk storage devices, tape storage devices, and shared storage devices. Storage node 741 is coupled to a disk storage device 751. Storage node 742 is coupled to tape storage device 752. Storage node 743 is coupled to disk storage device 753 and tape storage device 754. Storage nodes 744 and 745 are coupled to disk storage device 755 and 756, respectively, and shared tape library storage device 765 (e.g. tape drives 766a and 766b). An operational process of file data migration between different locations within the BSS layer is described at a high-level. The operational process is often represented by a flowchart. The flowchart is presented herein for illustrative purposes only, and is not limiting. In practice, those skilled in the relevant art(s) will appreciate, based on the teachings contained herein, that the invention can be achieved via a number of methods. Furthermore, the flow of control represented by the flowchart is also provided for illustrative purposes only, and it will be appreciated by persons skilled in the relevant art(s) that other operational control flows are within the scope and spirit of the invention.

Figure 8:
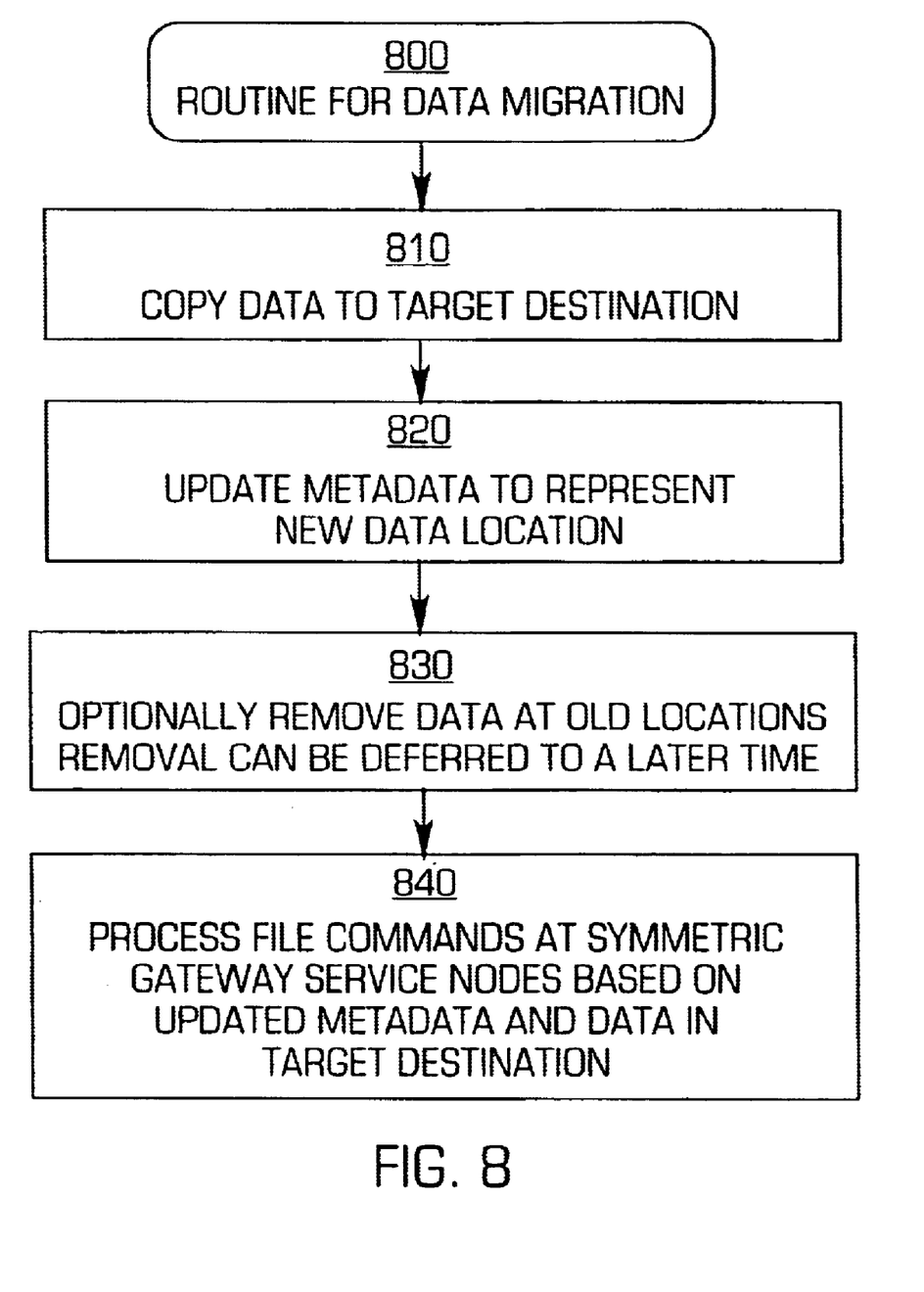
FIG. 8 is a simplified routine showing data migration according to an embodiment of the present invention.

FIG. 8 is a flowchart of a routine for data migration 800 according to an embodiment of the present invention (steps 810–840). In step 810, a file is copied to a target destination. For example, data 1 can be copied from storage device 753 to tertiary storage 754. This copy operation can be performed as part of hierarchical storage management where, for example, it may be desirable to move data accessed less frequently to less expensive storage media such as tape storage. This copy operation can be initiated manually or automatically through BSS Manager 770 for any reason.

In step 820, metadata entries corresponding to the migrated data are updated to reflect the new locations of the file data determined in step 810. For example, the BSL entries in the data structures shown in FIGS. 6A–D are updated to reflect the new locations for each filename corresponding to the files that have been moved.

In step 830, data at old locations can be optionally removed. Once data is copied to another location, the MDS can maintain entries that point to both the data at the old location and data at the new location by mirrors for example. However, the data from the old location can be deleted for any reason. Removal of old data is done transparently to the user.

In step 840, external protocol processing nodes access the updated metadata and have continuous access to file data regardless of its location. In addition, this data migration and access to the new locations is transparent to the external client. The symmetry between the gateway service processing nodes provides a further advantage of the present invention in that any of gateway service processing nodes 711–714 (and any future external protocol processing nodes added in scaling tile system 700), by using the updated metadata, can access the migrated data.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications. It should be further apparent to those skilled in the art that the various embodiments are not necessarily exclusive, but that features of some embodiments may be combined with features of other embodiments while remaining with the spirit and scope of the invention.

What is claimed is:

1. A file storage system comprising:
   a gateway service adapted to service requests from clients for accessing files having respective file identifiers;
   a storage service adapted to provide permanent storage of file data corresponding to the files; and
   a metadata service adapted to maintain metadata corresponding to the files, a portion of the metadata for each file correlating a respective locations of the files in the storage service with the respective file identifiers,
   the gateway service communicating with the metadata service to determine a location of the file data in the storage service in accordance with the file identifier, and with the storage service for providing clients access to the file data in accordance with the determined location, whereby the clients need only provide the file identifier to access the file from the determined location.

2. A file storage system according to claim 1, wherein the storage service comprises a plurality of storage devices, the location of the file data being associated with the plurality of storage devices.

3. A file storage system according to claim 2, wherein the storage service is adapted so that the number of storage devices is scalable.

4. A file storage system according to claim 2, wherein the storage service and the metadata service are adapted so that the location of the file data corresponding to a certain one of the files is associated with more than one of the plurality of storage devices.

5. A file storage system according to claim 4, wherein the more than one of the plurality of storage devices are determined in accordance with a redundancy scheme.

6. A file storage system according to claim 5, wherein the gateway service is adapted to provide access to an operable device of the more than one of the plurality of storage devices rather than a failed device of the more than one of the plurality of storage devices in accordance with a client request associated with the certain one of the files and with the location determined from the metadata service.

7. A file storage system according to claim 4, wherein the more than one plurality of storage devices are determined in accordance with a striping scheme.

8. A file storage system according to claim 2, wherein the metadata service is adapted to implement a hierarchical storage management scheme, a first set of the plurality of storage devices having a first capacity and performance characteristic, a second set of the plurality of storage devices having a second capacity and performance characteristic different than the first characteristic, the metadata service cooperating with the storage service to manage a migration of file data from the first set to the second set of storage devices, whereby clients requesting access to moved files corresponding to the migrated file data need only supply the file identifiers corresponding to the moved files.

9. A file storage system according to claim 1, wherein the gateway service comprises a plurality of gateway service nodes, the gateway service nodes being adapted to uniformly communicate with the metadata service, the storage service and the clients.

10. A file storage system according to claim 9, further comprising a load balance adapted to distribute the requests from the clients to the plurality of gateway service nodes.

11. A file storage system according to claim 9, wherein the gateway service nodes provide substantially the same performance in servicing the client file requests.

12. A file storage system according to claim 9, wherein the gateway service is adapted so that the number of gateway service nodes is scalable.

13. A file storage system according to claim 1, wherein the metadata service comprises a plurality of metadata nodes, the metadata nodes being adapted to uniformly communicate with the gateway service and to maintain the metadata.

14. A file storage system according to claim 1, wherein the metadata service is adapted to implement a hierarchical storage management scheme.

15. A file storage system according to claim 1, wherein the clients comprise one of at least one of a NFS client, a CIFS client, a HTTP client, and a FTP client, the gateway service being further adapted to service the client requests in accordance with the respective protocols used by the clients.

16. A file storage system comprising:
- a scalable number of gateway servers each adapted to service requests from clients for accessing files having respective file identifiers;
- a scalable number of storage servers each adapted to provide permanent storage of bitfile data corresponding to the files; and
- a metadata service adapted to maintain metadata corresponding to the files, a portion of the metadata for each file correlating a respective locations of the files in the storage service with the respective file identifiers,
- the gateway servers each communicating with the metadata service to determine a location of the bitfile data in the storage servers in accordance with the file identifier, and with the bitfile storage servers for providing clients access to the bitfile data in accordance with the determined location, whereby a client who accessed the file when the scalable number comprised a first value need only provide the same file identifier to access the file when the scalable number comprises a second value different than the first value.

17. A method for providing shared access to stored files, comprising:
- servicing requests from clients for accessing files having respective file identifiers;
- providing permanent storage of file data corresponding to the files in a first storage device; and
- maintaining metadata corresponding to the files in a second storage device different than the first device, a portion of the metadata for each file correlating a respective locations of the files in the first storage device with the respective file identifiers,
- determining a location of the file data in the first device in accordance with the file identifier from the metadata maintained in the second device; and
- providing clients access to the file data from the first device in accordance with the determined location, whereby the clients need only provide the file identifier to access the file from the determined location.

18. A method according to claim 17, wherein the first storage device comprises a number of storage devices, the location of the file data being associated with the number of storage devices.

19. A method according to claim 18, wherein the maintaining step includes accounting for a scaling of the number of storage devices.

20. A method according to claim 18, wherein the maintaining step includes correlating the location of the file data corresponding to a certain one of the files being associated with more than one of the number of storage devices.

21. A method according to claim 20, further comprising determining the more than one of the number of storage devices in accordance with a redundancy scheme.

22. A method according to claim 21, further comprising providing access to an operable device of the more than one of the number of storage devices rather than a failed device of the more than one of the number of storage devices in accordance with a client request associated with the certain one of the files and with the determined location.

23. A method according to claim 20, further comprising determining the more than one of the number of storage devices in accordance with a striping scheme.

24. A method according to claim 17, wherein the servicing step includes servicing the requests in a uniform manner by a plurality of gateway service nodes.

25. A method according to claim 24, further comprising distributing the requests from the clients to the plurality of gateway service nodes.

26. A method according to claim 24, wherein the gateway service nodes provide substantially the same performance in servicing the client file requests.

27. A method according to claim 17, wherein the servicing step includes servicing the requests in accordance with at least one of a NFS protocol, a CIFS protocol, a HTTP protocol, and a FTP protocol.

28. A method according to claim 17, further comprising:
- migrating certain of the file data from the first device to a third storage device different than the first and second storage devices; and
- updating the metadata corresponding to the migrated file data to reflect the migrated location of the migrated file data,
- whereby the clients need only provide the file identifier associated with the migrated file data to access the file from the migrated location.

29. A method according to claim 28, further comprising: removing the file data from old locations in the first storage device.

* * * * *